United States Patent
King et al.

(10) Patent No.: US 7,620,725 B2
(45) Date of Patent: Nov. 17, 2009

(54) METADATA COLLECTION WITHIN A TRUSTED RELATIONSHIP TO INCREASE SEARCH RELEVANCE

(75) Inventors: Raymond King, Portland, OR (US); Paul Stahura, Sammamish, WA (US); Jay Westerdal, Bellevue, WA (US)

(73) Assignee: About Us, Inc., Bellevue, WA (US)

( * ) Notice: Subject to any disclaimer, the term of this patent is extended or adjusted under 35 U.S.C. 154(b) by 518 days.

(21) Appl. No.: 11/294,002

(22) Filed: Dec. 5, 2005

(65) Prior Publication Data
US 2007/0130109 A1 Jun. 7, 2007

(51) Int. Cl.
G06F 15/16 (2006.01)
G06F 12/00 (2006.01)
(52) U.S. Cl. .................. 709/229; 709/217; 709/218
(58) Field of Classification Search .......... 709/229, 709/217, 218, 250; 707/1–10
See application file for complete search history.

(56) References Cited

U.S. PATENT DOCUMENTS

| | | | |
|---|---|---|---|
| 2005/0097000 A1* | 5/2005 | Freishtat et al. | 705/26 |
| 2005/0114330 A1* | 5/2005 | Chau | 707/5 |
| 2005/0222975 A1* | 10/2005 | Nayak et al. | 707/3 |
| 2005/0235343 A1* | 10/2005 | Stephens | 726/6 |
| 2007/0214097 A1* | 9/2007 | Parsons et al. | 706/12 |

* cited by examiner

*Primary Examiner*—Zarni Maung
(74) *Attorney, Agent, or Firm*—John Berryhill

(57) ABSTRACT

A system and method for collecting internet publisher data is disclosed in which metadata pertaining to the internet publisher is acquired in the context of a trusted relationship with the internet publisher to increase reliability of metadata utilized in the presentation of internet search engine results. In a preferred embodiment, metadata collected by an internet domain registrar incident to registration of an internet domain name is included among metadata acquired in the trusted relationship.

12 Claims, 3 Drawing Sheets

METADATA COLLECTION WITHIN A TRUSTED RELATIONSHIP TO INCREASE SEARCH RELEVANCE

FIELD OF THE INVENTION

The present Invention relates to a system and method for the collection of metadata from internet publishers, and the use of such data to improve relevance of results provided by internet search engine providers.

BACKGROUND

As the quantity of information accessible on the internet has grown, and continues to grow, the most widely used and popular web sites have become the sites of internet search providers devoted primarily to finding information elsewhere on the internet. Search providers operate what are known as search engines which provide a user interface to a large database that associates an index of terms with addresses of information determined to be relevant to those terms. Such addresses typically consist of a Uniform Resource Locator (URL) corresponding to a web page accessible via the hyper-text transport protocol (HTTP).

Search providers typically build a search database by analyzing the content of information accessible on the internet. In the context of web pages, search providers utilize automated programs—robots, or spiders—which "crawl" web sites by following links, retrieving published content, and then indexing the published content in accordance with proprietary weighting algorithms. Such content may also be indexed in conjunction with other information available from public sources, such as telephone or business directories.

Search providers struggle with the issue of providing results which are relevant to the queries entered by users. The problem of relevance has several aspects. One of the intriguing features of the internet is that it is borderless—a web page from a business a block away from the user is as accessible as one on the opposite site of the globe. A user needing a haircut, however, is likely to consider a local barber shop to be more relevant to his or her problem than information about the world's largest barber shop half a continent away. In that context geographic location is a high component of actual relevance. In other contexts, other particular information about the publisher of internet content may be a higher component of actual relevance than what can be gleaned by crawling an indexing the publisher's content. For example, knowing the type of business in which a particular entity engages may be more relevant to a searcher, and more meaningful, than the name of the business.

Complicating the problem of providing relevant information is the conscious behavior of publishers to attempt to artificially increase the apparent relevance of their content in connection with particular search queries. The hypertext mark-up language (HTML) itself includes definitions of meta-tags, which were originally intended to provide meta information, such as keywords and content summaries, apart from page content, for the purpose of indexing web content. However, in view of the value of high search engine rankings in connection with various search terms, internet publishers soon began to engage in "keyword spamming"—the repetitive use of terms within a web page for the sole purpose of increasing apparent search engine relevance in connection with those terms. Search providers have found that meta-tags and simple word-counting measures of the content and relevant index terms for a web page are useless, and in fact now de-rank sites which appear to be engaged in artificial relevance-boosting techniques. The exact ranking mechanisms used by search providers have become trade secrets, because to publish those mechanisms is to provide a road map to abuse. The result is a cat-and-mouse game between search providers and unethical publishers to discover the techniques by which one seeks to defeat the plans of the other.

The arms race between search providers and publishers arises primarily by the manner in which search providers collect information by crawling published content on the internet. To provide, for example, geographically relevant information, search engine providers utilize algorithms for detecting the presence of postal addresses on a web page. However, so long as information about a publisher is obtained through the same anonymous channel as the published information itself, it will continue to be the subject of abuse and/or ambiguity. Of course, not all failures of relevance are the result of abuse, but merely reflect the limits of language. Someone selling "Jefferson Airplane Tickets" may be selling souvenirs of 1960's rock music, or travel to the state of Missouri. In the absence of such information as whether the publisher operates a travel agency or a memorabilia store, there is no search indexing algorithm which will detect the difference.

SUMMARY

In accordance with the present Invention, there is provided a system and method by which internet publisher metadata is collected and provided to a search provider independent of the search provider's data collection and indexing mechanism, and preferably through one or more trusted relationships in which authenticity of the metadata may be tested, verified, or otherwise be considered more reliable than web-published data. In one embodiment, the trusted relationships include the internet domain name registrar-registrant relationship, in which internet domain name registrants are contractually obligated to provide correct contact information, such as a name, address, telephone number, and email address in association with a domain name registered to the registrant. As a domain name is typically a feature of a uniform resource locator, the registrar-registrant relationship, and the contract obligation thereof, provides an independent mechanism by which such metadata can be associated with a uniform resource locator.

BRIEF DESCRIPTION OF THE DRAWING

The foregoing Summary, and the following Detailed Description will be best understood in connection with the attached Drawing, in which.

DETAILED DESCRIPTION

Figure 1:
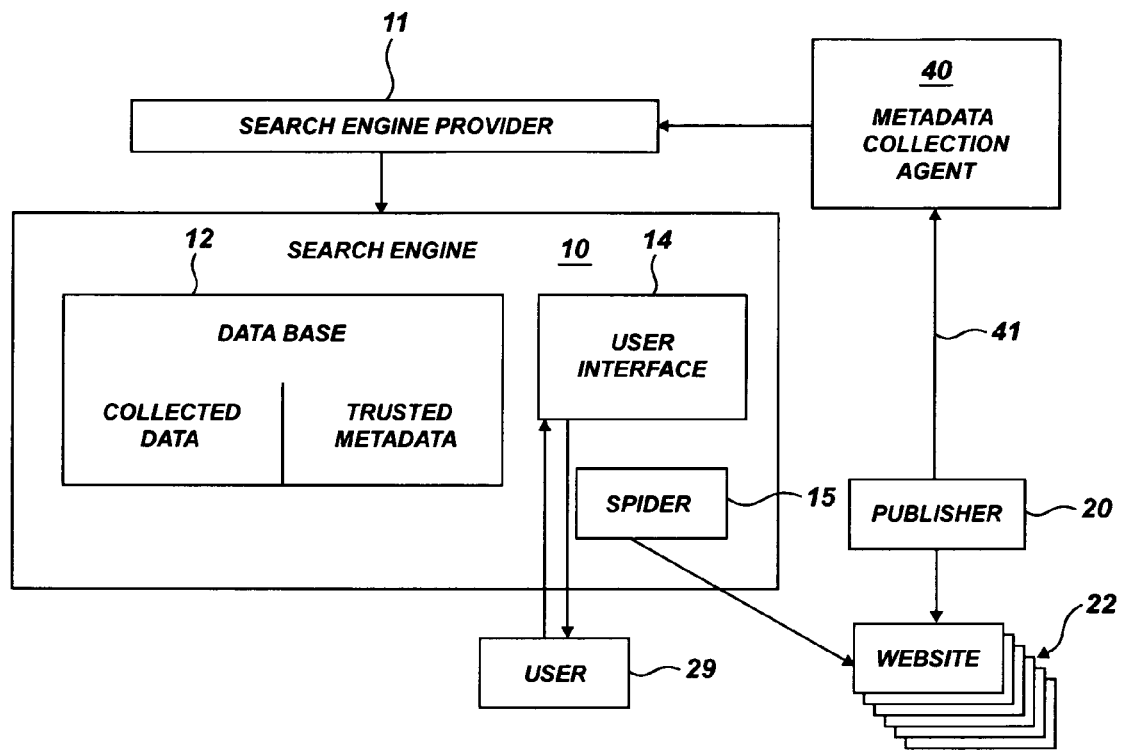
FIG. 1 is a functional block diagram of a metadata collection system in accordance with the present Invention.

Referring now to FIG. 1, there is shown a search engine 10 operated by an internet search provider 11. The search engine 10 comprises a database 12, a user interface 14, and a published data collection mechanism such as a spider 15. The database 12 stores uniform resource locators in association with index terms derived from content published by internet publishers, such as website publisher 20. Website publisher 20 publishes a website 22, which may comprise a single web page or multiple web pages herein designated published information. Such published information preferably consists of published content accessible via a hypertext transport protocol query to a uniform resource locator corresponding to the web page or pages constituting the website 22. The search engine 10 accesses the website 22 by operating a robot or spider 15 which obtains the contents of the website 22. In accordance with an indexing or ranking algorithm carried out by the search engine 10, the website 22 contents are analyzed and indexed in the database 12 as collected data in association with the URL corresponding to the address of the website. The search engine 10 further comprises a user interface 16 for receiving search queries from a user 29 and for responsively retrieving one or more URL's from the database 12 deemed relevant to the query received from the user.

Further shown in FIG. 1 is a metadata collection agent 40, the metadata collection agent 40 obtains metadata pertaining to the internet publisher 20 by a channel or mechanism independent of the website 22, such as by a trusted relationship 41. In a preferred embodiment, the metadata collection agent 40 may comprise an internet domain registrar. To operate the website 22 at a URL including an internet domain name, the publisher 20 must register the internet domain name with any of various internet domain name registrars which provide domain name registration services. In domain name systems utilizing the root directory operated under contract to the United States Department of Commerce and coordinated by the Internet Corporation for Assigned Names and Numbers (ICANN), such a domain name registrar is normally an ICANN-accredited registrar or service reseller of an accredited registrar, and the registrar is required to maintain defined standards of domain name registration accuracy. For example, the registrar is required to include in its domain name registration contract with the registrant, a material provision requiring the registrant to provide and maintain a true and correct name, address, email address, telephone number, and other information collectively referred to as domain registration data, sometimes referred to as WHOIS data. The nature of such data items may vary in accordance with the top-level domain in which the domain name is registered. In so-called sponsored TLD's (sTLD's), the registrant must normally make certifications pertinent to the sTLD, such as verifying the registrant's status as a bona fide museum in the .museum sTLD, that the registrant is one of several types of aerospace organizations in the .aero TLD, etc. The contractual relationship between a registrar and a registrant is one example of a "trusted relationship" as used herein to denote a relationship providing a reason to believe that the metadata provided in the context of the relationship is more trustworthy than metadata gleaned outside of such a relationship, such as by analysis of the content of the website 22. In other words, a "trusted relationship" is a relationship in which there is a definite material incentive for the publisher to provide truthful information, or a penalty for providing untruthful information. In the course of registering a domain name, a domain name registrant will typically provide payment information which both confirms the Domain registration data and distinctly identifies the registrant. Other aspects of trusted relationships would include those in which the metadata collection agent is able to verify the metadata on terms at least as trustworthy, or more so, than the domain name registrar-registrant relationship.

The metadata collection agent 40 provides metadata collected in the context of the trusted relationship 41, and corresponding relevant URL's, to the search engine provider 10, so that the search engine provider may index trusted metadata in association with the respective URL's in the database 12.

Subsequently, when a user 29 indicates via the user interface 14 that the user is seeking information pertinent to an item of the metadata collected by the metadata collection agent, then the search engine may be arranged to rank the corresponding URL(s) relatively more highly and/or with greater confidence than URL(s) associated with metadata that was the result of inference mechanisms outside of the trusted relationship. Alternatively, or in addition thereto, the search engine may be configured to identify search results corresponding to publisher websites that have provided trusted metadata by such methods as a symbolic indication or "seal", or by other means for graphically distinguishing results based upon trusted metadata from results based solely on collected data. For example, if the user is seeking results preferably related to a specific geographic location, such as a city or state, then search results associated with metadata based on Domain registration information corresponding to the URL, and indicating such a city or state, may be deemed relevant in preference to search results having URL's for which Domain registration data was not provided to the search engine provider by the metadata collection agent 40.

In an alternative embodiment based on the internet domain name registrar-registrant relationship as the preferred trusted relationship, the large and growing number of internet domain registrars may render it preferable for the trusted relationship to constitute a chain of trusted relationships. For example, the metadata collection agent may comprise an agency or organization which, though not necessarily a domain name registrar, has established contractual relationships with one or more domain name registrars to aggregate Domain registration data from such registrars prior to submission to the search engine provider 11.

Operation of the metadata collection agent may be funded by several methods alone or in combination. One method would be by a fee paid by the publisher directly or indirectly to the metadata collection agent. In embodiments where the metadata collection agent 40 comprises an internet domain name registrar, such a fee may be incorporated into the registration fee, or may be an additional fee for publishers desiring their metadata to be made available to the search engine provide in the manner provided by the metadata collection agent. In embodiments where the metadata collection agent aggregates Domain registration data from multiple registrars, then the registrars may be charged a wholesale service fee by the metadata collection agent. Alternatively, in embodiments where the search engine provider pays a fee to the metadata collection agent, then the registrar(s) associated with the metadata collection agent may provide metadata submission to the search engine provider as a free service. Alternatively, or in addition thereto, the registrar or publisher may be charged a fee by the metadata collection agent and or the search provider for use of the service defined herein.

Preferably, metadata submission is provided on a fee basis to the publisher 20, whether directly or indirectly, to provide a further contractual mechanism for ensuring the accuracy and integrity of the metadata. Whether provided through an internet domain name registrar(s), or as an agency independent of internet domain name registrar(s), providing the metadata collection service on a contractual basis extending beyond the standard domain name registration contract provides further advantages. First, a more extensive set of metadata can be collected from the publisher, including such information as:

multiple geographic locations, which may correspond to particular URLs under a single domain name, such as headquarters, branch offices, store locations, etc.

multiple URLs, which may each be associated with a function or department of the publisher, so that a search for "technical support" may be more accurately routed to a technical support page, and that a search for "sales" may be more accurately routed to a sales page, rather than a general corporate information page, for example classification of business by, for example, SIC (standard industry code) numbers, or other business classification systems that would disambiguate search terms that are common to separate businesses (e.g. to disambiguate a "pipe seller" as a business engaged in plumbing supplies from a business engaged in tobacco smoking supplies)

appropriate keywords subject to verification and/or assignment by the metadata collection provider and, where provided by the publisher, subject to contractual penalties for providing false, inappropriate, or misleading keywords textual descriptions about the publisher or the website contents, such as a concise textual description of the publisher and their goods and services certificates held by the publisher, including professional certifications such as legal, academic, or professional certifications organizational memberships or affiliations, such as membership in a professional society or association other certifications or approvals, such as a secure certificate registrant, authorized credit card merchant, verified Paypal® merchant, subscriber to a privacy policy verification agent, subscriber to an independent content rating agency, etc.

Self certifications, preferably subject to verification and/or contractual penalty by the metadata collection agent, such as whether the publisher has committed to defined unsolicited commercial email practices or subscribed to other codes of best practices as may be defined by the metadata collection agent or other agency such as a chamber of commerce, Better Business Bureau®, or professional association the presence, at one or more URL's, of information particularly suited to a defined data protocol or terminal device, such as whether the content is designed for access by mobile devices or a type of audio and/or visual media reproduction device or software whether the entity has appropriate certification to operate a particular type of business, such as law, accounting, medicine, pharmacy, and the like a graphic image, or link to a graphic image representing the publisher's logo hours of operation (including hours of operation of multiple sites and/or departments), along with relevant time zone information Contractual penalties as may be imposed to safeguard against publisher-supplied metadata may include defined payments, forfeiture of a bond paid by the publisher, suspension or termination of a domain name registration, notification to the search provider to de-rate or de-list the publisher, and/or provision of notice of breach to users of the search engine who have or may conduct searches that would otherwise indicate the publisher among the results. Such a contractual obligation may be imposed by an independent accreditation authority, or by the metadata collection agent.

Figure 2:
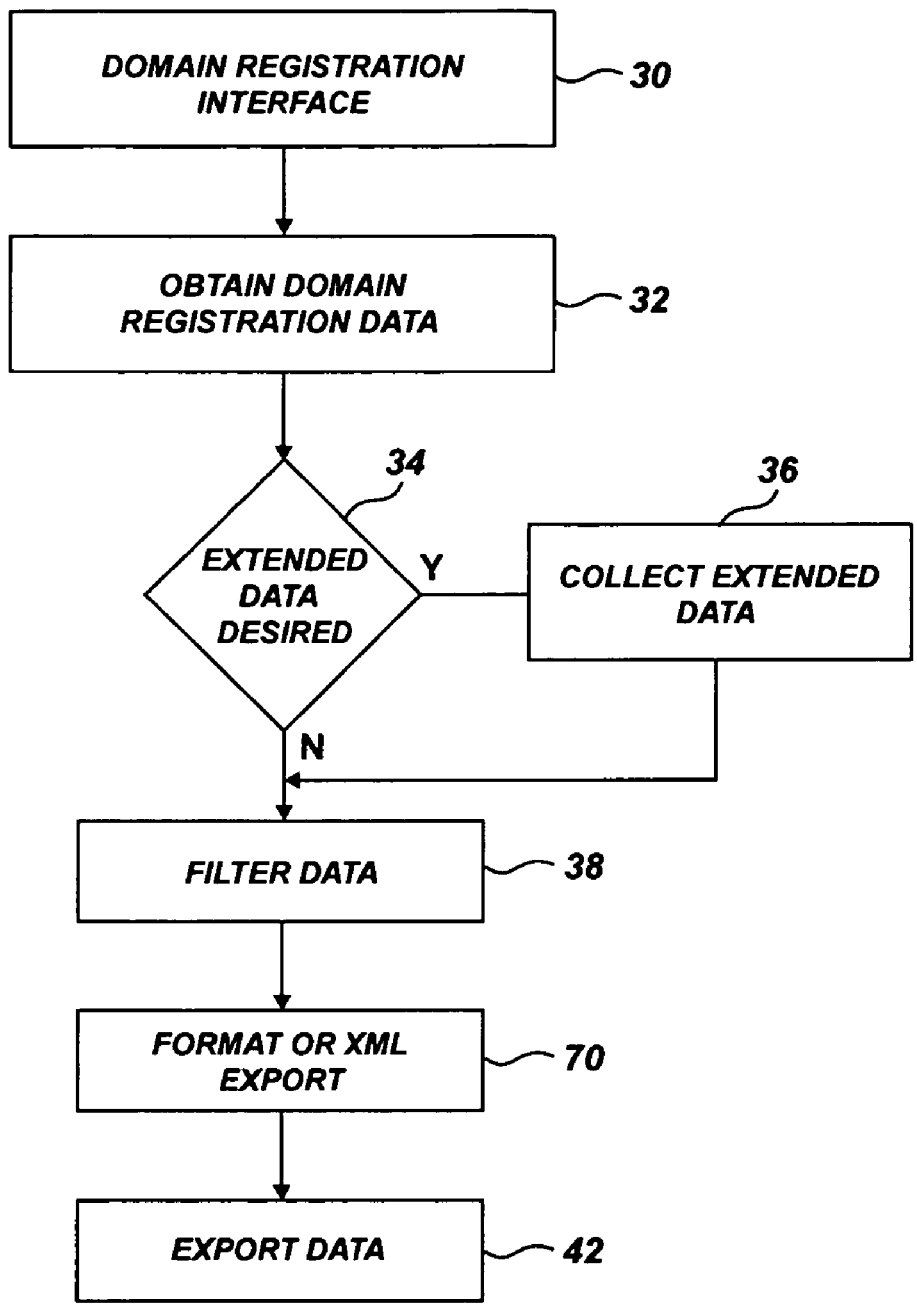
FIG. 2 is a logical flow diagram carried out within the metadata collection system of FIG. 1.

In a preferred embodiment, metadata collection can be implemented in connection with the operation of an internet domain name registrar as shown in FIG. 2. Among other services offered by a domain name registrar, the registrar may contract with the metadata collection agent to offer domain name registrants an option of providing metadata of the types noted hereinabove for provision to a search engine provider. As part of the domain registration process, or in response to an advertisement by the domain name registrar, a domain registrant enters the domain registration or management interface 30 of the domain name registrar, and is provided with the option of making metadata available in accordance with the invention. This service may be included in the cost of domain registration and renewal, or may be provided at an additional fee to the domain registrant. Having selected to provide such information, the registrant's Domain registration data is obtained in step 32. The information may be displayed to the registrant, along with an appropriate reminder to review the information for completeness. Then, in step 34, the registrant is provided with the option, which may also be provided for an additional fee, of providing extended metadata beyond the basic domain registration data that may be contractually required for registration in the top-level domain of the domain name. If the registrant selects this option, then, in step 36 the registrant is provided with appropriate forms or other input mechanism for providing the extended data, such as noted above. Otherwise, and after entry of the extended data, the process continues to step 38. In step 38, certain information is preferably removed from the basic Domain registration data. For example, such information as normally included in domain registration data may include a telephone number, email address, or specific internal address, which may correspond to a data operation center or domain name manager, but not to the operation of the physical business represented by the domain name. Such information as the zip code and telephone area code, are more likely to provide relevant geographic information, while preventing unwanted dissemination of, for example, an email address used primarily for domain name management. After appropriate filtering of data has been performed, then, in step 40, the filtered Domain registration data, along with any extended data, is put into a standard format. In a preferred embodiment, all of the data is reproduced in an XML document having defined delimiters for identifying the data type of each item of data collected. Finally, in step 42, the data is exported from the registrar for delivery to the search engine provider. Such delivery may be mediated by the metadata collection agent to ensure quality control of the data, and may be provided to the metadata collation agent or the search engine provider on a continuous or batch update basis. Metadata collected in this manner may be treated as "extended domain registration data" by maintaining the extended metadata in association with basic Domain registration data collected incident to domain name registration, such that the registrar may appopriately notify the registrant to maintain accurate extended metadata in connection with traditional notifications concerning domain registration data accuracy and updates.

Figure 3:
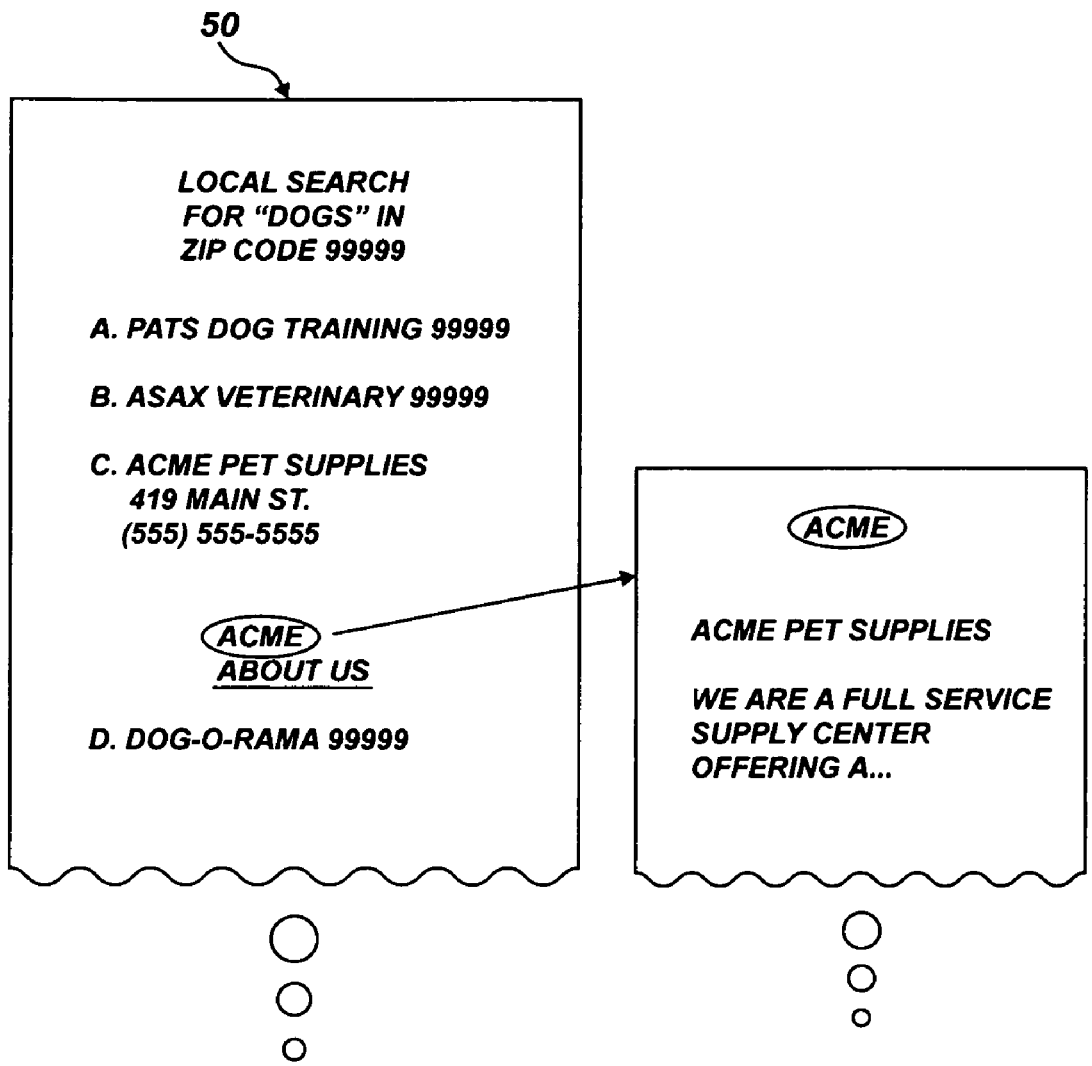
FIG. 3. is a diagrammatic view of a display generated by a search engine in accordance with the present Invention.

A preferred manner in which the metadata collected in the context of the trusted relationship may be incorporated into search results generated by the search engine provider is shown in FIG. 3. The search result display provided by the user interface in response to a query relating to "dogs" in zip code "99999" is shown as search result page 50. The search result page 50 includes listings of items found in the database relevant to the keyword "dogs" and the zip code 99999. The result entries designated A, B, and D, are exemplary of results returned on the basis of ordinary search indexing. The result designated C, is exemplary of a result corresponding to a metadata collection subscriber in accordance with the present invention. Along with the search result, specific address, telephone, and other data may be returned in a manner which is designated to be more trustworthy than other results listed on the page. Additionally, the subscriber's logo, provided in the extended data, may be shown in the results, with or without an additional link designated "About Us" or other designation indicating the availability of a summary of detailed information comprising the extended data.

The "About Us" designation may be in the form of a hyperlink which, when activated, retrieves the extended metadata from the search engine database and displays the extended data as a "pop-up" page displaying the extended information arranged in a readable format. Alternatively, the extended information may be displayed as a "mouse rollover" window, as such an implementation is readily known in the art. In another alternative embodiment, the extended data displayed in connection with a metadata link on the search result page may be coded as a reference to yet another server, such as a server operated by the metadata collection agent. In such an embodiment, the metadata collection agent maintains the extended data in a database configured to respond to hypertext transport protocol queries from the search engine to provide, upon user activation of the "About Us" hyperlink from the search results, a web page generated from the database showing the extended data or a subset thereof to the user. In such an embodiment, the metadata collection agent can maintain a log of such queries for the purpose of recording statistics of access to the extended data. Such statistics can further be reported to the publisher, and used for fixed-rate or performance-based billing to the publisher for the provision of extended data. Access statistics of this type may include the count and frequency of access to the extended data, along with the geographic locations deduced from internet protocol addresses of users, and search terms employed by the users to retrieve search results in which the publisher was identified. The web pages returned by the "About Us" hyperlink may further include dynamic interactive content, such as web log, bulletin board, forum or wiki, by which the publisher, customers or other visitors to the web page may publish news, product information, or customer reviews relating to the publisher or its goods and services.

In yet other alternative embodiments, operation of the metadata collection agent may be incorporated into the business operations of the search provider, such that the step of providing the collected metadata to from the metadata collection agent to the search provider is performed by the search provider as a data collection process separate from the crawling process normally used to index internet content. Although the trusted relationship has been described herein in connection with operation of a domain name registrar, it will be appreciated that such a relationship may be established via independent contract between the metadata collection agent and the publisher, or in conjunction with other services such as web hosting, directory listing, advertising agency services, and the like.

That which is claimed is:

1. A method of enhancing relevance of results provided by a search engine operated by a search provider maintaining a database of uniform resource locators, comprising the steps of:

establishing a trusted relationship including a contract for services between a data collection agent other than the search provider, and an internet publisher collecting metadata by the data collection agent from the internet publisher pursuant to the contract of the trusted relationship between the data collection agent and the internet publisher providing the metadata to the search provider to be indexed in association with at least one of said uniform resource locators corresponding to information made available via the internet access by said internet publisher.

2. The method of claim 1 wherein the trusted relationship is a domain name registrar registrant relationship, and wherein the step of providing metadata to the search provider comprises the step of providing domain name registration data to the search engine provider.

3. The method of claim 2 wherein the step of providing metadata comprises the steps of:

providing metadata contractually required incident to domain registration in a top-level domain; and providing extended metadata in addition to the contractually required data.

4. The method of claim 3, wherein the extended metadata comprises at least one of a business classification, a keyword relevant to a business, a professional certificate registration number, an organizational membership identification, a graphic image, and a list of hours of operation.

5. The method of claim 2 comprising the step of collecting metadata from a plurality of domain name registrars corresponding to multiple internet publishers, and charging a fee to the domain name registrars for performing the step of providing the metadata to the search engine provider.

6. The method of claim 1 wherein the step of establishing a trusted relationship comprises a step of establishing a contractual relationship with the internet publisher.

7. The method of claim 6 wherein the step of establishing a contractual relationship with the internet publisher comprises a step of defining a penalty for the provision of inaccurate metadata.

8. The method of claim 1, further comprising the step of distinguishing search results containing a reference to the internet publisher from among other search results generated by the search engine provider.

9. The method of claim 8 wherein the step of distinguishing search results includes preferentially ranking a search result containing a reference to the internet publisher.

10. The method of claim 8 wherein the step of distinguishing search results includes visually distinguishing a search result containing a reference to the internet publisher.

11. The method of claim 8 wherein the step of distinguishing search results includes a step of displaying the metadata in connection with a search result containing a reference to the internet publisher.

12. The method of claim 11 wherein the step of displaying the metadata includes a step of providing a hyperlink to a uniform resource locator specified in the metadata.

* * * * *